(12) United States Patent
Park (10) Patent No.: US 9,242,676 B2
(45) Date of Patent: Jan. 26, 2016

(54) FRONT VEHICLE BODY REINFORCING STRUCTURE

(71) Applicants: Hyundai Motor Company, Seoul (KR); Kia Motors Corporation, Seoul (KR)

(72) Inventor: Ji Woong Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/448,514

(22) Filed: Jul. 31, 2014

(65) Prior Publication Data

US 2015/0166123 A1    Jun. 18, 2015

(30) Foreign Application Priority Data

Dec. 17, 2013   (KR) ........................ 10-2013-0157655

(51) Int. Cl.
*B60N 99/00* (2006.01)
*B62D 25/08* (2006.01)

(52) U.S. Cl.
CPC ................................... *B62D 25/082* (2013.01)

(58) Field of Classification Search
CPC .................................................... B62D 25/082
See application file for complete search history.

(56) References Cited

U.S. PATENT DOCUMENTS

2015/0069785 A1* 3/2015 Sakakibara .......... B62D 25/085
296/187.1

FOREIGN PATENT DOCUMENTS

| JP | 09-099865 A | 4/1997 | |
|---|---|---|---|
| JP | 2000-211551 A | 8/2000 | |
| JP | 4598473 B2 | 10/2010 | |
| KR | 1999-0030693 U | 7/1999 | |
| KR | 101518925 B1 * | 5/2015 | ............ B62D 25/08 |

* cited by examiner

*Primary Examiner* — Lori L Lyjak
(74) *Attorney, Agent, or Firm* — Morgan, Lewis & Bockius LLP (57) ABSTRACT

A front vehicle body reinforcing structure may include front side members which are disposed at both left and right sides of the vehicle, each of which includes a front tip portion that is positioned at a front side of the vehicle, and each of which has a first closed cross section and front fender apron members which are disposed at both left and right sides of the vehicle, each of which includes a front tip portion that is positioned at the front side in the length direction of the vehicle and coupled to the front tip portion of the front side member, and each of which has a second closed cross section, thereby improving performance for coping with a frontal collision of the vehicle.

11 Claims, 10 Drawing Sheets

FRONT VEHICLE BODY REINFORCING STRUCTURE

CROSS-REFERENCE TO RELATED APPLICATION

The present application claims priority to and the benefit of Korean Patent Application No. 10-2013-0157655 filed Dec. 17, 2013, the entire contents of which are incorporated herein for all purposes by reference.

BACKGROUND OF THE INVENTION

1. Field of the Invention

The present invention relates to a front vehicle body reinforcing structure which improves performance for coping with a frontal collision accident of a vehicle by forming a front tip portion of a front fender apron member, which constitutes a front vehicle body of the vehicle, in a length direction of the vehicle so that the front tip portion of the front fender apron member is extended up to a front tip portion of a front side member in the length direction of the vehicle, and integrally coupled to the front tip portion of the front side member.

2. Description of Related Art

In general, a front vehicle body of a vehicle is a structure that is positioned at a front side in the length direction of the vehicle, and forms an engine room, and includes a front end module which forms a front side of the engine room and on which a cooling module, a head lamp, and the like are mounted, front fender apron members which form both left and right portions of the engine room, at which a suspension system is mounted, and provide a space in which wheels are installed, a dash panel which is positioned at a rear side of the engine room and partitions a passenger room and the engine room, and the like.

In addition, front side members, which are formed to be extended in the length direction of the vehicle, are disposed at both left and right sides at a lower portion of the engine room so as to reinforce structural rigidity of the front vehicle body, and a sub frame is disposed at a lower portion of the front side members in order to mount and support the suspension system and the like as well as an engine and a transmission that are installed in the engine room.

The front fender apron member has one end that is placed on and connected to an upper portion of the front side member at a predetermined position in a length direction, and the other end that is connected to a front pillar.

A bumper beam, which is formed to be extended in a width direction of the vehicle, is mounted on a front tip portion of the front side member in order to improve performance for coping with a frontal collision of the vehicle.

Figure 1:
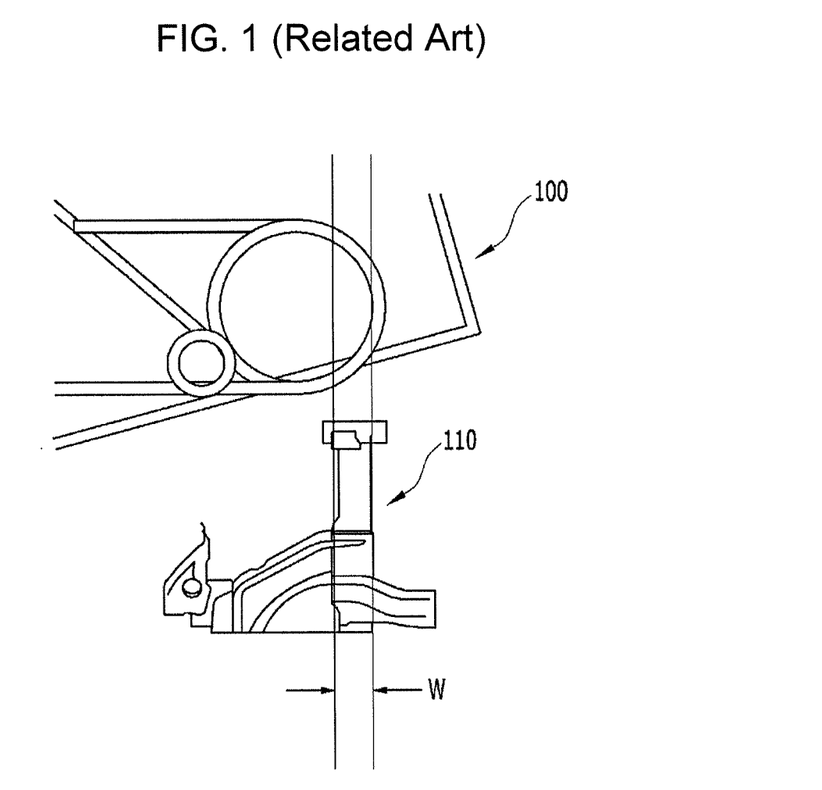
FIG. 1 is an explanatory view illustrating a small overlap collision between a front side member according to the related art and a collision object.

In a case in which the vehicle, which is provided with the front vehicle body having the aforementioned structure, undergoes a frontal collision with small overlap with a collision object such as an obstacle or other vehicles when the vehicle travels, that is, in a case in which the collision object collides with the vehicle in a state in which the collision object deviates to one side in the width direction of the vehicle, as illustrated in FIG. 1, a width W of a front tip portion of a front side member 110 becomes small such that the width W of the overlap between a collision object 100 and the front side member 110 becomes small, and as a result, there are problems in that the front side member 110 cannot be properly deformed rearward in a length direction thereof, but is bent upward in a height direction of the vehicle or leftward and rightward in a width direction of the vehicle, occupants cannot be safely protected because the front side member cannot effectively cope with the frontal small overlap of the vehicle, and excessive collision damage to the vehicle is caused.

The above disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a front vehicle body reinforcing structure which may increase an overlap width with a collision object at the time of a frontal collision or a frontal small overlap collision accident of a vehicle so as to effectively absorb and disperse frontal collision energy, thereby improving performance for coping with a frontal collision of the vehicle, more safely protecting occupants in the vehicle, and reducing collision damage to the vehicle.

In an aspect of the present invention, a front vehicle body reinforcing structure may include front side members which are formed to be extended in a length direction of a vehicle, are disposed at both left and right sides in a width direction of the vehicle, respectively, each front side member includes a front tip portion that is positioned at a front side in the length direction of the vehicle, and each front side member has a first closed cross section that is continuously formed in the length direction of the vehicle.

The vehicle body reinforcing structure may further include front fender apron members which are formed to be extended in the length direction of the vehicle, are disposed at both left and right sides in the width direction of the vehicle, respectively, each of which includes a front tip portion that is positioned at the front side in the length direction of the vehicle and coupled to the front tip portion of the front side member, and each of which has a second closed cross section that is continuously formed in the length direction of the vehicle.

The front tip portion of the front side member and the front tip portion of the front fender apron member may be formed to match each other in the length direction of the vehicle.

The front tip portion of the front fender apron member and the front tip portion of the front side member may be disposed in parallel outward in the width direction of the vehicle, and a dual closed cross section may be formed in the width direction of the vehicle by the first closed cross section and the second closed cross section.

Mounting brackets for mounting front shock absorbing devices for the vehicle may be attached to the front tip portion of the front fender apron member and the front tip portion of the front side member.

A rear portion of the front fender apron member in the length direction of the vehicle may be positioned above the front tip portion of the front fender apron member in a height direction of the vehicle, and a curved portion, which is inclined downward in the height direction of the vehicle from an upper side toward a front side of the vehicle, may be formed between the rear portion and the front tip portion.

The first closed cross section and the second closed cross section may have a quadrangular box shape.

The front side member may have a front side inner member which includes a " ⊏ "-shaped cross section that is directed outward in the width direction of the vehicle, a " ⊏ "-shaped channel that is formed by the " ⊏ "-shaped cross section extended in a length direction, and a front side outer member which is inserted into the "⊏"-shaped channel, and coupled to the front side inner member so as to form the first closed cross section.

First coupling flanges of the front side inner member, which are extended outward in the width direction of the vehicle, may be formed integrally with upper and lower edges in the height direction of the vehicle at a front portion of the front side inner member in the length direction of the vehicle.

Second coupling flanges of the front side inner member, which are extended upward and downward in the height direction of the vehicle, may be formed integrally with upper and lower edges in the height direction of the vehicle at a rear portion of the front side inner member in the length direction of the vehicle.

First coupling flanges of the front side outer member, which are extended outward in the width direction of the vehicle, may be formed integrally with upper and lower edges in the height direction of the vehicle at a front portion of the front side outer member in the length direction of the vehicle.

Second coupling flanges of the front side outer member, which are extended upward and downward in the height direction of the vehicle, may be formed integrally with upper and lower edges in the height direction of the vehicle at a rear portion of the front side outer member in the length direction of the vehicle.

The first coupling flanges of the front side outer member and the first coupling flanges of the front side inner member may overlap and be joined to each other upward and downward in the height direction of the vehicle, and the second coupling flanges of the front side outer member and the second coupling flanges of the front side inner member may overlap and be joined to each other leftward and rightward in the width direction of the vehicle.

The front fender apron member may include a front fender apron upper member which includes a "⊏"-shaped cross section that is directed downward in the height direction of the vehicle, and a "⊏"-shaped channel that is formed by the "⊏"-shaped cross section extended in a length direction the front fender apron upper member, a front fender apron lower member which includes a "⊏"-shaped cross section that is directed upward in the height direction of the vehicle, and a "⊏"-shaped channel that is formed by the "⊏"-shaped cross section extended in a length direction of the front fender apron upper member, in which the front fender apron upper member and the front fender apron lower member are combined and coupled upward and downward so that the "⊏"-shaped cross section of the front fender apron upper member and the "⊏"-shaped cross section of the front fender apron lower member are combined to form the second closed cross section.

A first coupling flange of the front fender apron upper member, which is extended outward in the width direction of the vehicle, may be formed integrally with an outer edge of the front fender apron upper member in the width direction of the vehicle.

A vertical wall portion of the front fender apron upper member, which is vertically extended upward and downward in the height direction of the vehicle, may be provided at a front portion of the front fender apron upper member in the length direction of the vehicle.

A second coupling flange of the front fender apron upper member, which is extended inward in the width direction of the vehicle, may be formed at a rear portion of the front fender apron upper member in the length direction of the vehicle.

A first coupling flange of the front fender apron lower member, which is extended outward in the width direction of the vehicle, may be formed integrally with an outer edge of the front fender apron lower member in the width direction of the vehicle.

A vertical wall portion of the front fender apron lower member, which is vertically extended upward and downward in the height direction of the vehicle, may be provided at a front portion of the front fender apron lower member in the length direction of the vehicle.

A second coupling flange of the front fender apron lower member, which is extended inward in the width direction of the vehicle, may be formed at a rear portion of the front fender apron lower member in the length direction of the vehicle.

The first coupling flange of the front fender apron upper member and the first coupling flange of the front fender apron lower member may overlap and be joined to each other upward and downward.

The second coupling flange of the front fender apron upper member and the second coupling flange of the front fender apron lower member may overlap and be joined to each other upward and downward.

A part of the vertical wall portion of the front fender apron upper member and a part of the vertical wall portion of the front fender apron lower member may overlap and be joined to each other so as to form the second closed cross section.

A part of the vertical wall portion of the front fender apron upper member and a part of the vertical wall portion of the front fender apron lower member may overlap and be joined to each other, and then are inserted into the channel formed in the front side outer member so as to be joined to the front side outer member.

A part of the front fender apron upper member and a part of the front fender apron lower member may be joined to the first coupling flanges, respectively, when the first coupling flange of the front side outer member and the first coupling flange of the front side inner member are joined to each other, such that the first and second closed cross sections have a structure that is continuous in the width direction of the vehicle.

According to the front vehicle body reinforcing structure according to the exemplary embodiment of the present invention, the front tip portion of the front fender apron member in the length direction of the vehicle is formed to be extended up to the front tip portion of the front side member in the length direction of the vehicle, and securely and integrally coupled to the front tip portion of the front side member, such that an overlap width with a collision object is increased at the time of a frontal collision accident of the vehicle, and the front fender apron member and the front side member directly receive impact energy transferred through the collision object and are properly deformed, thereby effectively absorbing and reducing the impact energy.

In addition, the front side member and the front fender apron member absorb impact energy while the front side member and the front fender apron member simultaneously receive impact energy and are deformed, thereby improving efficiency in absorbing impact energy. Further, impact energy may be effectively transferred and dispersed to other portions in the vehicle body through a first load path that is connected to other portions in the vehicle body via the front side member, and a second load path that is connected to other portions in the vehicle body via the front fender apron member, such that performance for coping with a frontal collision and a frontal small overlap collision of the vehicle is improved, thereby more safely protecting occupants in the vehicle and reducing damage to the vehicle at the time of a frontal collision accident of the vehicle.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Reference numerals set forth in the Drawings include reference to the following elements as further discussed below.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings so that those skilled in the Field of the Invention to which the present invention pertains may carry out the exemplary embodiment.

Figure 2:
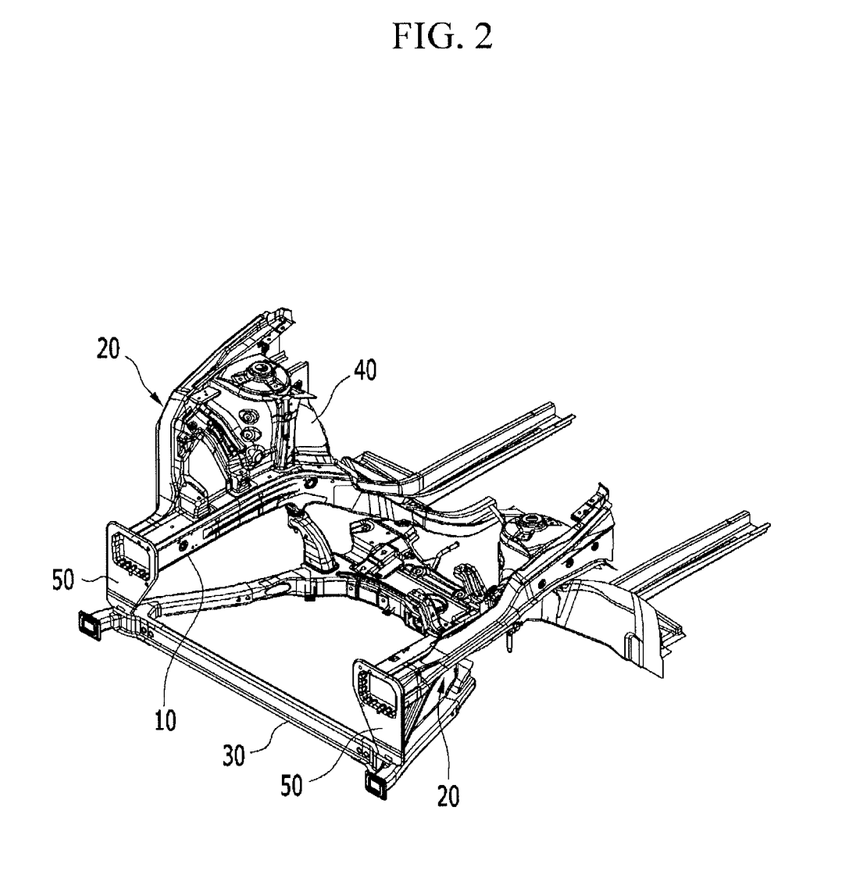
FIG. 2 is a perspective view of a front vehicle body reinforcing structure according to an exemplary embodiment of the present invention.

Referring to FIG. 2, a front vehicle body reinforcing structure for a vehicle according to an exemplary embodiment of the present invention may include front side members 10, front fender apron members 20, a sub frame 30, wheel housings 40, and the like.

The front side members 10 are formed to be extended in a length direction of the vehicle, disposed at both left and right sides in a width direction of the vehicle, and mainly serve to reinforce rigidity in the length direction of the vehicle in the front vehicle body structure.

The sub frame 30 is disposed below the front side member 10 in a height direction of the vehicle, has a structure that is formed to be extended in the length and width directions of the vehicle, and mainly serves to mount and support a suspension system, an engine, and the like.

The wheel housing 40 is formed to be extended in the height and width directions of the vehicle, and a lower end portion of the wheel housing 40 in the height direction of the vehicle may be mounted and supported on an upper portion of the front side member 10.

The front fender apron members 20 are formed to be extended in the length direction of the vehicle, and are disposed at both left and right sides in the width direction of the vehicle. A rear portion of each front fender apron member 20 in the length direction of the vehicle is coupled to the wheel housing 40, and a front tip portion of the front fender apron member 20 in the length direction of the vehicle may be formed to be extended up to a front tip portion of the front side member 10 so that the front tip portions of the front fender apron member 20 and the front side member 10 may be integrally coupled to each other.

Mounting brackets 50 for mounting front shock absorbing devices of the vehicle, for example, a crash box, a bumper beam, and the like may be attached to the front tip portions of the front fender apron member 20 and the front side member 10.

Figure 3:
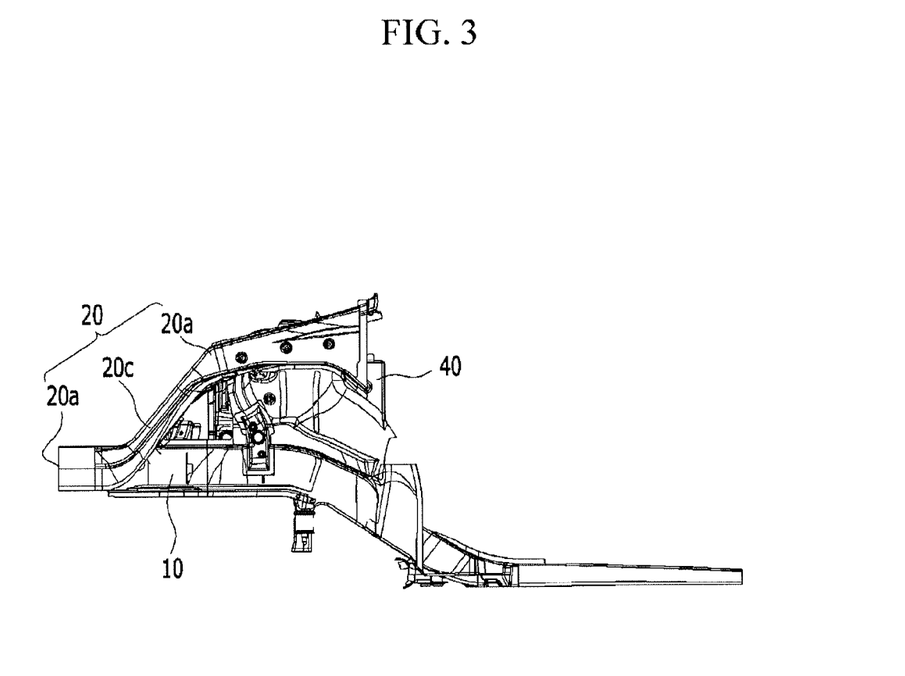
FIG. 3 is a side view of the front vehicle body reinforcing structure according to an exemplary embodiment of the present invention.

Referring to FIG. 3, a rear portion 20a of the front fender apron member 20 is positioned above a front tip portion 20b thereof in the height direction of the vehicle, a height of the front fender apron member 20 is gradually decreased from the rear portion 20a toward the front tip portion 20b, and a curved portion 20c may be formed between the rear portion 20a and the front tip portion 20b.

The curved portion 20c may have a structure that is inclined downward in the height direction of the vehicle from an upper side toward a front side of the vehicle.

Figure 4:
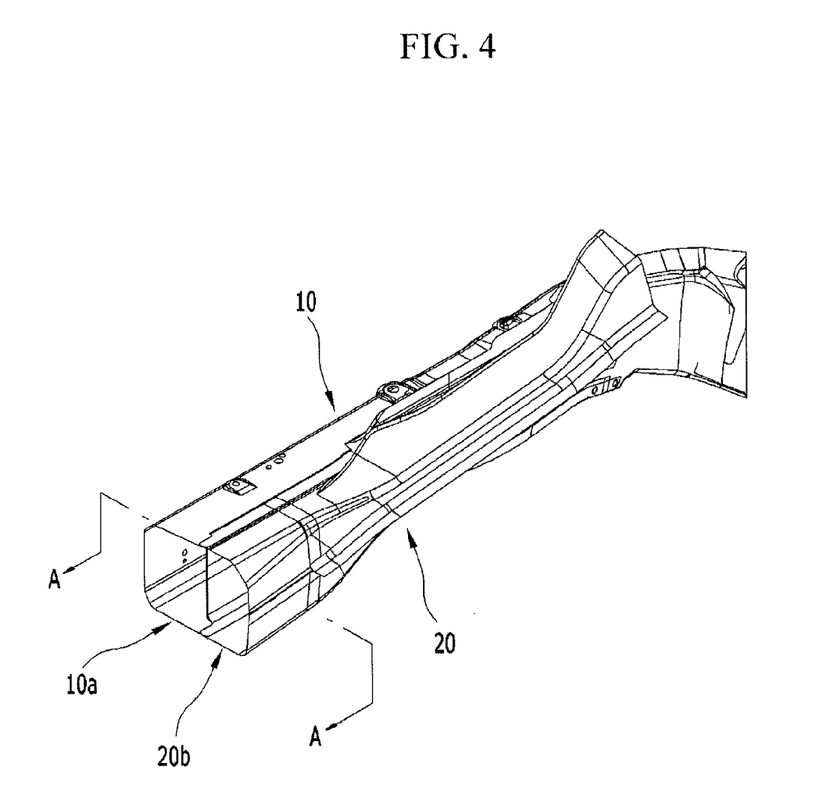
FIG. 4 is a coupled perspective view of a front side member and a front fender apron member according to an exemplary embodiment of the present invention.

Referring to FIG. 4, a front tip portion 10a of the front side member 10 and the front tip portion 20b of the front fender apron member 20 may be formed to have the same protruding length in a direction toward the front side of the vehicle.

The front tip portion 10a of the front side member 10 may be formed to have a cross section that has approximately a quadrangular box shape, and the front tip portion 20b of the front fender apron member 20 may also be formed to have a cross section that has approximately a quadrangular box shape.

Accordingly, a closed cross section having a dual quadrangular box shape may be formed by the front tip portion 10a of the front side member 10 and the front tip portion 20b of the front fender apron member 20 in the width direction of the vehicle.

The front tip portion 10a of the front side member 10 is positioned inward in the width direction of the vehicle, and the front tip portion 20b of the front fender apron member 20 is positioned further outward than the front tip portion 10a of the front side member 10 in the width direction of the vehicle, such that the front tip portion 10a of the front side member 10 and the front tip portion 20b of the front fender apron member 20 may be positioned to overlap each other in parallel in the width direction of the vehicle, and then coupled to each other.

Figure 5:
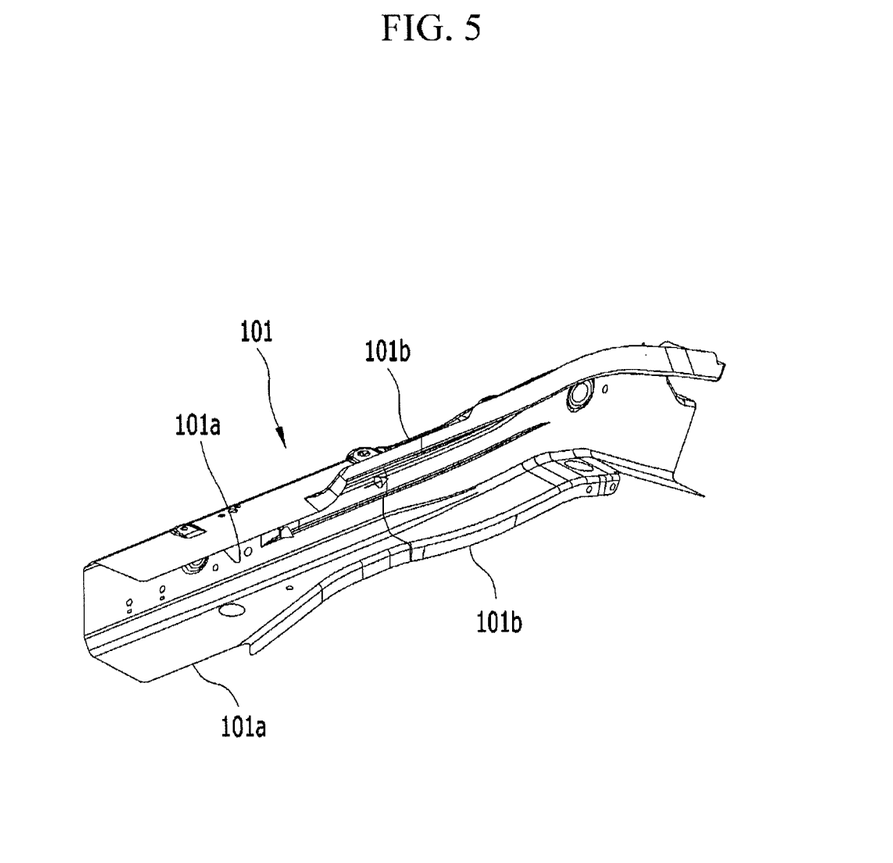
FIG. 5 is a perspective view of a front side inner member according to an exemplary embodiment of the present invention.
Figure 6:
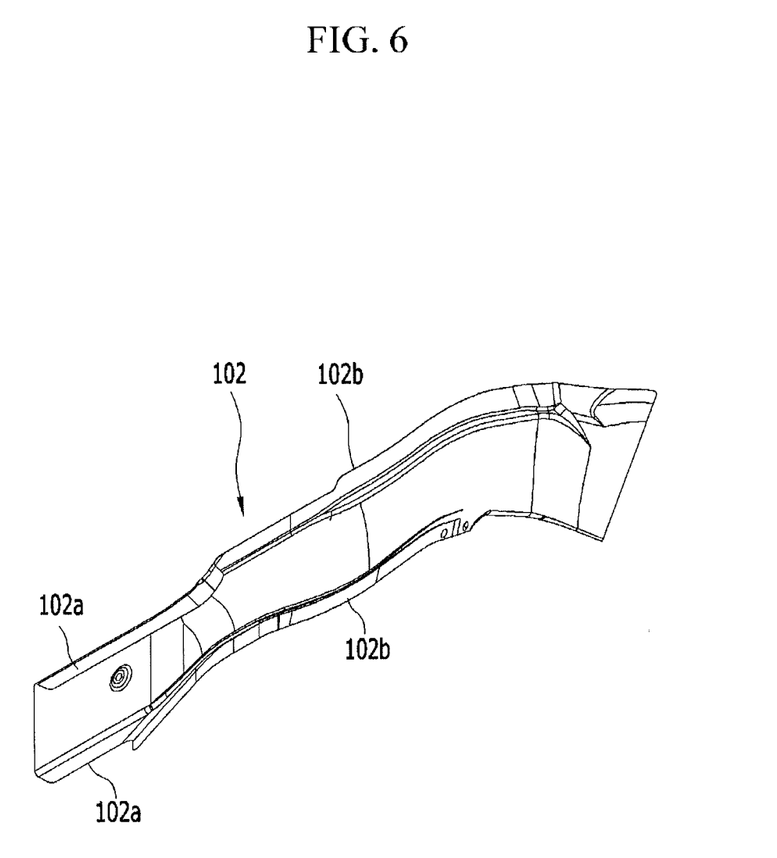
FIG. 6 is a perspective view of a front side outer member according to an exemplary embodiment of the present invention.

Referring to FIGS. 5 and 6, respectively, the front side member 10 may be formed by coupling a front side inner member 101 and a front side outer member 102 to each other.

The front side inner member 101 may be formed to have a cross section having approximately a "⊏" shape.

The "⊏"-shaped cross section may be disposed to be directed outward in the width direction of the vehicle, and formed to be extended in a length direction of the front side inner member 101 so as to form a "⊏"-shaped channel.

First coupling flanges 101a, which are extended outward in the width direction of the vehicle, may be formed integrally with upper and lower edges in the height direction of the vehicle at a front portion of the front side inner member 101 in the length direction of the vehicle.

Second coupling flanges 101b, which are extended upward and downward in the height direction of the vehicle, may be formed integrally with upper and lower edges in the height direction of the vehicle at a rear portion of the front side inner member 101 in the length direction of the vehicle.

The front side outer member 102 may be formed in an approximately flat plate shape in a length direction thereof.

First coupling flanges 102a, which are extended outward in the width direction of the vehicle, may be formed integrally with upper and lower edges in the height direction of the vehicle at a front portion of the front side outer member 102 in the length direction of the vehicle.

Second coupling flanges 102b, which are extended upward and downward in the height direction of the vehicle, may be formed integrally with upper and lower edges in the height direction of the vehicle at a rear portion of the front side outer member 102 in the length direction of the vehicle.

The front side outer member 102 may be inserted into the "⊏"-shaped channel formed in the front side inner member 101 so as to be integrally coupled to the front side inner member 101.

In a state in which the front side outer member 102 is inserted into the "⊏"-shaped channel of the front side inner member 101, the first coupling flanges 102a of the front side outer member 102 and the first coupling flanges 101a of the front side inner member 101 may overlap and be joined to each other upward and downward in the height direction of the vehicle, and the second coupling flanges 102b of the front side outer member 102 and the second coupling flanges 101b of the front side inner member 101 may overlap and be joined to each other leftward and rightward in the width direction of the vehicle.

Figure 7:
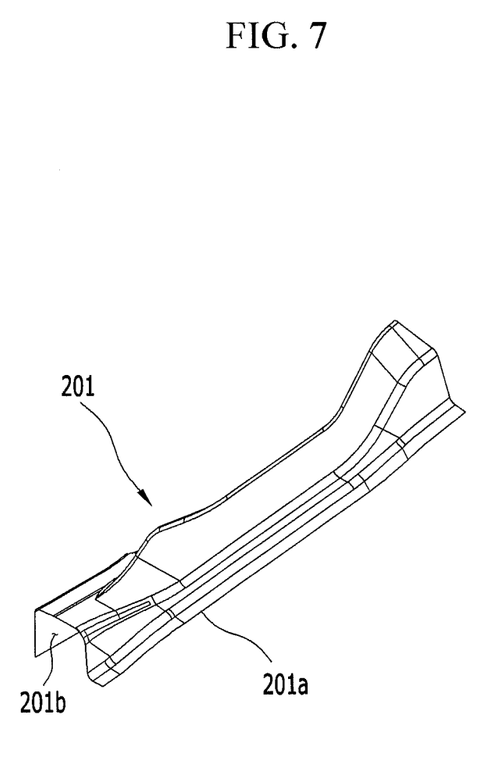
FIG. 7 is a perspective view of a front fender apron upper member according to an exemplary embodiment of the present invention.
Figure 8:
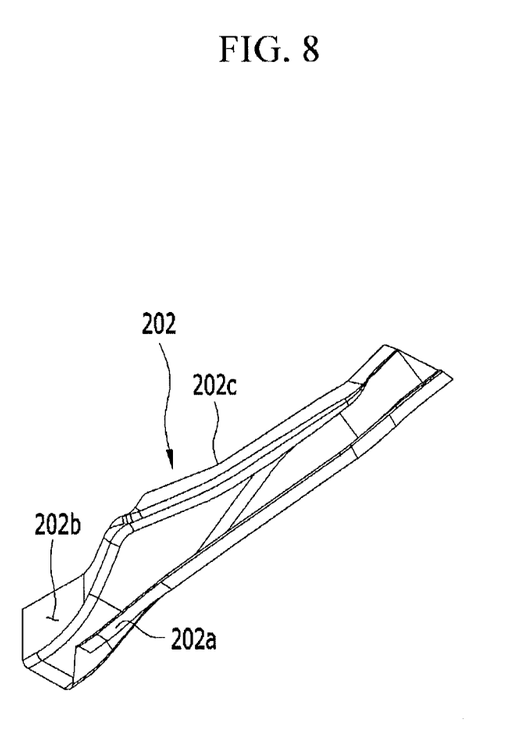
FIG. 8 is a perspective view of a front fender apron lower member according to an exemplary embodiment of the present invention.

Referring to FIGS. 7 and 8, respectively, the front fender apron member 20 may be formed by coupling a front fender apron upper member 201 and a front fender apron lower member 202 to each other.

The front fender apron upper member 201 may be formed to have a cross section that has approximately a "⊏" shape that is directed downward.

The "⊏"-shaped cross section, which is directed downward, may be formed to be extended in a length direction of the front fender apron upper member 201 so as to form a "⊏"-shaped channel.

A first coupling flange 201a, which is extended outward in the width direction of the vehicle, may be formed integrally with an outer edge of the front fender apron upper member 201 in the width direction of the vehicle, and the first coupling flange 201a may be formed to be extended in the length direction of the front fender apron upper member 201.

Figure 9:
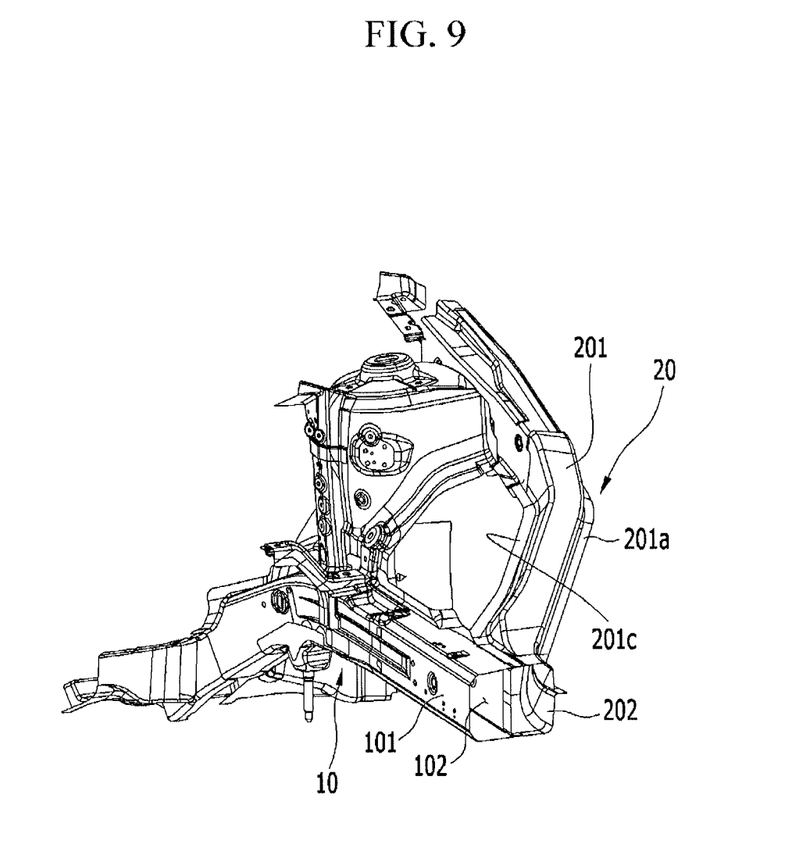
FIG. 9 is a coupled perspective view of the front side member and the front fender apron member according to an exemplary embodiment of the present invention.

A vertical wall portion 201b, which is vertically extended upward and downward in the height direction of the vehicle, is provided on a front portion of the front fender apron upper member 201 in the length direction of the vehicle, and as illustrated in FIG. 9, a second coupling flange 201c, which is extended inward in the width direction of the vehicle, may be formed to be extended in the length direction of the front fender apron upper member 201 at a rear portion of the front fender apron upper member 201 in the length direction of the vehicle.

The front fender apron lower member 202 may be formed to have a cross section that has approximately a "⊏" shape that is directed upward.

The "⊏"-shaped cross section, which is directed upward, may be formed to be extended in a length direction of the front fender apron lower member 202 so as to form a "⊏"-shaped channel that is directed upward.

A first coupling flange 202a, which is extended outward in the width direction of the vehicle, may be formed integrally with an outer edge of the front fender apron lower member 202 in the width direction of the vehicle, and the first coupling flange 202a may be formed to be extended in the length direction of the front fender apron lower member 202.

A vertical wall portion 202b, which is vertically extended upward and downward in the height direction of the vehicle, is provided on a front portion of the front fender apron lower member 202 in the length direction of the vehicle, and a second coupling flange 202c, which is extended inward in the width direction of the vehicle, may be formed to be extended in the length direction of the front fender apron lower member 202 at a rear portion of the front fender apron lower member 202 in the length direction of the vehicle.

The front fender apron upper member 201 is disposed at the upper side in the height direction of the vehicle, and the front fender apron lower member 202 is disposed at the lower side in the height direction of the vehicle. In a state in which the front fender apron upper member 201 and the front fender apron lower member 202 are disposed so that the respective "⊏"-shaped channels face each other, the first coupling flange 201a of the front fender apron upper member 201 and the first coupling flange 202a of the front fender apron lower member 202 overlap and are joined to each other upward and downward, the second coupling flange 201c of the front fender apron upper member 201 and the second coupling flange 202c of the front fender apron lower member 202 overlap and are joined to each other upward and downward, and a part of the vertical wall portion 201b of the front fender apron upper member 201 and a part of the vertical wall portion 202b of the front fender apron lower member 202 overlap and are joined to each other. Accordingly, the "⊏"-shaped channel of the front fender apron upper member 201 and the "⊏"-shaped channel of the front fender apron lower member 202 match each other so as to form a closed cross section having approximately a quadrangular shape, and the closed cross section has a structure that is continuous in a length direction of the front fender apron member 20.

Figure 10:
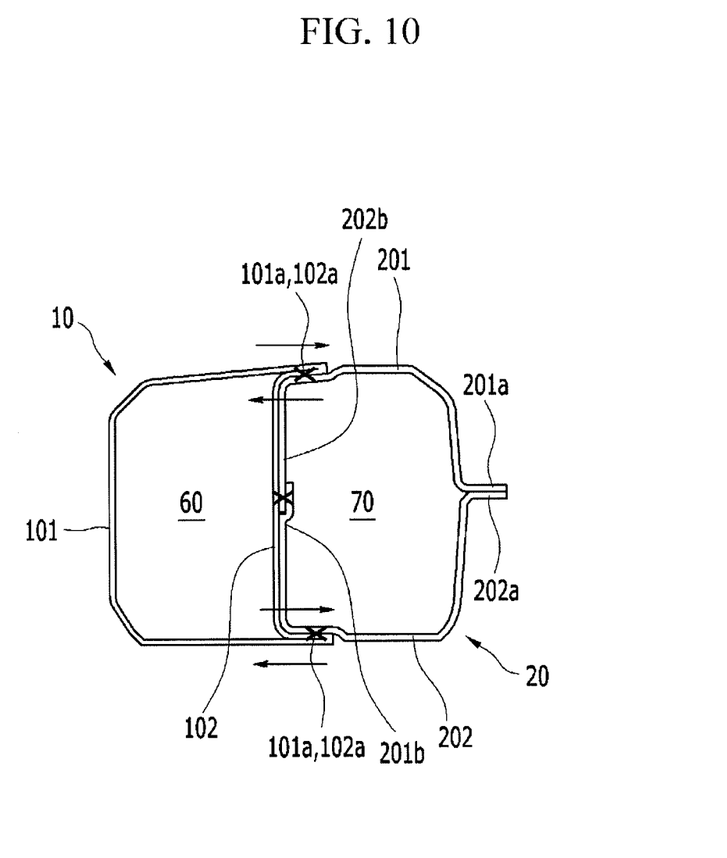
FIG. 10 is a cross-sectional view taken along line A-A of FIG. 4 according to an exemplary embodiment of the present invention.

Referring to FIGS. 9 and 10, respectively, the front side member 10 and the front fender apron member 20 are joined and coupled to each other in a state in which the front side member 10 and the front fender apron member 20 are disposed in parallel in the width direction of the vehicle, so as to have a structure in which a first closed cross section 60 formed by the front side member 10 and a second closed cross section 70 formed by the front fender apron member 20 are continuously disposed in parallel in the width direction of the vehicle.

The first closed cross section 60 is formed when in a state in which the front side outer member 102 is inserted into the "⊏"-shaped channel of the front side inner member 101, the first coupling flange 102a of the front side outer member 102 and the first coupling flange 101a of the front side inner member 101 overlap and are joined to each other upward and downward in the height direction of the vehicle, and the second coupling flange 102b of the front side outer member 102 and the first coupling flange 101b of the front side inner member 101 overlap and are joined to each other leftward and rightward in the width direction of the vehicle.

The second closed cross section 70 is formed when in a state in which the "⊏"-shaped channel of the front fender apron upper member 201 and the "⊏"-shaped channel of the front fender apron lower member 202 are disposed to match each other, the first coupling flange 201a of the front fender apron upper member 201 and the first coupling flange 202a of the front fender apron lower member 202 overlap and are joined to each other upward and downward, the second coupling flange 201c of the front fender apron upper member 201 and the second coupling flange 202c of the front fender apron lower member 202 overlap and are joined to each other upward and downward, and a part of the vertical wall portion 201b of the front fender apron upper member 201 and a part of the vertical wall portion 202b of the front fender apron lower member 202 overlap and are joined to each other leftward and rightward in the width direction of the vehicle.

In addition, a part of the vertical wall portion 201b of the front fender apron upper member 201 and a part of the vertical wall portion 202b of the front fender apron lower member 202 overlap and are joined to each other, and are inserted into the channel formed in the front side outer member 102 so as to be joined to the front side outer member 102, and a part of the front fender apron upper member 201 and a part of the front fender apron lower member 202 are joined to the first coupling flanges 101a and 102a, respectively, when the first coupling flange 102a of the front side outer member 102 and the first coupling flange 101a of the front side inner member 101 are joined to each other, such that the two first and second closed cross sections 60 and 70 are joined to each other in the width direction of the vehicle so as to have a continuous structure.

As such, when external force is applied in a state in which a part of the front fender apron member 20 is inserted into the front side member 10, and the front fender apron member 20 and the front side member 10 are coupled by being welded upward and downward, shearing stress is applied in a horizontal direction to portions that are welded upward and downward, as illustrated by arrows, thereby reducing a risk that the welded portions are fractured.

While the configuration in which the coupling flanges are joined to each other by welding has been described in the exemplary embodiment, the coupling flanges may be coupled to each other by adhesion, bolting, or the like in addition to the welding.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A front vehicle body reinforcing structure comprising:
   front side members which are formed to be extended in a length direction of a vehicle, are disposed at both left and right sides in a width direction of the vehicle, respectively,
   wherein each front side member includes a front tip portion that is positioned at a front side in the length direction of the vehicle, and
   wherein the each front side member has a first closed cross section that is continuously formed in the length direction of the vehicle; and
   wherein the each front fender apron member which is formed to be extended in the length direction of the vehicle, is disposed at both left and right sides in the width direction of the vehicle, respectively,
   wherein the each front fender apron member includes a front tip portion that is positioned at the front side in the length direction of the vehicle and coupled to the front tip portion of the front side member, and
   wherein the each front fender apron member has a second closed cross section that is continuously formed in the length direction of the vehicle.

2. The front vehicle body reinforcing structure of claim 1, wherein the front tip portion of the front side member and the front tip portion of the front fender apron member are formed to match each other in the length direction of the vehicle.

3. The front vehicle body reinforcing structure of claim 1, wherein the front tip portion of the front fender apron member and the front tip portion of the front side member are disposed in parallel outward in the width direction of the vehicle, and a dual closed cross section is formed in the width direction of the vehicle by the first closed cross section and the second closed cross section.

4. The front vehicle body reinforcing structure of claim 1, wherein
   mounting brackets for mounting front shock absorbing devices for the vehicle are attached to the front tip portion of the front fender apron member and the front tip portion of the front side member.

5. The front vehicle body reinforcing structure of claim 1, wherein a rear portion of the front fender apron member in the length direction of the vehicle is positioned above the front tip portion in a height direction of the vehicle, and wherein a curved portion, which is inclined downward in the height direction of the vehicle from an upper side toward a front side of the vehicle, is formed between the rear portion and the front tip portion of the front fender apron member.

6. The front vehicle body reinforcing structure of claim 1, wherein the first closed cross section and the second closed cross section have a quadrangular box shape.

7. The front vehicle body reinforcing structure of claim 1, wherein the front side member includes:
 a front side inner member having a "⊏"-shaped cross section that is directed outward in the width direction of the vehicle, and a channel that is formed by the "⊏"-shaped cross section extended in a length direction; and
 a front side outer member which is inserted into the "⊏"-shaped channel, and coupled to the front side inner member so as to form the first closed cross section.

8. The front vehicle body reinforcing structure of claim 7, wherein first coupling flanges, which are extended outward in the width direction of the vehicle, are formed integrally with upper and lower edges in the height direction of the vehicle at a front portion of the front side inner member in the length direction of the vehicle,
 wherein second coupling flanges, which are extended upward and downward in the height direction of the vehicle, are formed integrally with upper and lower edges in the height direction of the vehicle at a rear portion of the front side inner member in the length direction of the vehicle,
 wherein first coupling flanges, which are extended outward in the width direction of the vehicle, are formed integrally with upper and lower edges in the height direction of the vehicle at a front portion of the front side outer member in the length direction of the vehicle,
 wherein second coupling flanges, which are extended upward and downward in the height direction of the vehicle, are formed integrally with upper and lower edges in the height direction of the vehicle at a rear portion of the front side outer member in the length direction of the vehicle,
 wherein the first coupling flanges of the front side outer member and the first coupling flanges of the front side inner member overlap and are joined to each other upward and downward in the height direction of the vehicle, and
 wherein the second coupling flanges of the front side outer member and the second coupling flanges of the front side inner member overlap and are joined to each other leftward and rightward in the width direction of the vehicle.

9. The front vehicle body reinforcing structure of claim 8, wherein the front fender apron member includes:
 a front fender apron upper member which includes a "⊏"-shaped cross section that is directed downward in the height direction of the vehicle and a channel that is formed by a "⊏"-shaped cross section extended in a length direction of the front fender apron upper member; and
 a front fender apron lower member which includes a "⊏"-shaped cross section that is directed upward in the height direction of the vehicle, and a channel that is formed by a "⊏"-shaped cross section extended in the length direction of the front fender apron upper member,
 wherein the front fender apron upper member and the front fender apron lower member are combined and coupled upward and downward so that the "⊏"-shaped cross section of the front fender apron upper member and the "⊏"-shaped cross section of the front fender apron lower member are combined to form the second closed cross section.

10. The front vehicle body reinforcing structure of claim 9, wherein
 a first coupling flange, which is extended outward in the width direction of the vehicle, is formed integrally with an outer edge of the front fender apron upper member in the width direction of the vehicle,
 a vertical wall portion, which is vertically extended upward and downward in the height direction of the vehicle, is provided at a front portion of the front fender apron upper member in the length direction of the vehicle,
 a second coupling flange, which is extended inward in the width direction of the vehicle, is formed at a rear portion of the front fender apron upper member in the length direction of the vehicle,
 a first coupling flange, which is extended outward in the width direction of the vehicle, is formed integrally with an outer edge of the front fender apron lower member in the width direction of the vehicle,
 a vertical wall portion, which is vertically extended upward and downward in the height direction of the vehicle, is provided at a front portion of the front fender apron lower member in the length direction of the vehicle,
 a second coupling flange, which is extended inward in the width direction of the vehicle, is formed at a rear portion of the front fender apron lower member in the length direction of the vehicle,
 the first coupling flange of the front fender apron upper member and the first coupling flange of the front fender apron lower member overlap and are joined to each other upward and downward,
 the second coupling flange of the front fender apron upper member and the second coupling flange of the front fender apron lower member overlap and are joined to each other upward and downward, and
 a part of the vertical wall portion of the front fender apron upper member and a part of the vertical wall portion of the front fender apron lower member overlap and are joined to each other so as to form the second closed cross section.

11. The front vehicle body reinforcing structure of claim 10, wherein
 a part of the vertical wall portion of the front fender apron upper member and a part of the vertical wall portion of the front fender apron lower member overlap and are joined to each other, and then are inserted into the channel formed in the front side outer member and joined to the front side outer member, and
 a part of the front fender apron upper member and a part of the front fender apron lower member are joined to the first coupling flanges, respectively, when the first coupling flange of the front side outer member and the first coupling flange of the front side inner member are joined to each other, wherein the first and second closed cross sections have a structure that is continuous in the width direction of the vehicle.

* * * * *